Jan. 12, 1965   E. H. MILLER ETAL   3,165,167
NOISE INHIBITING DEVICE

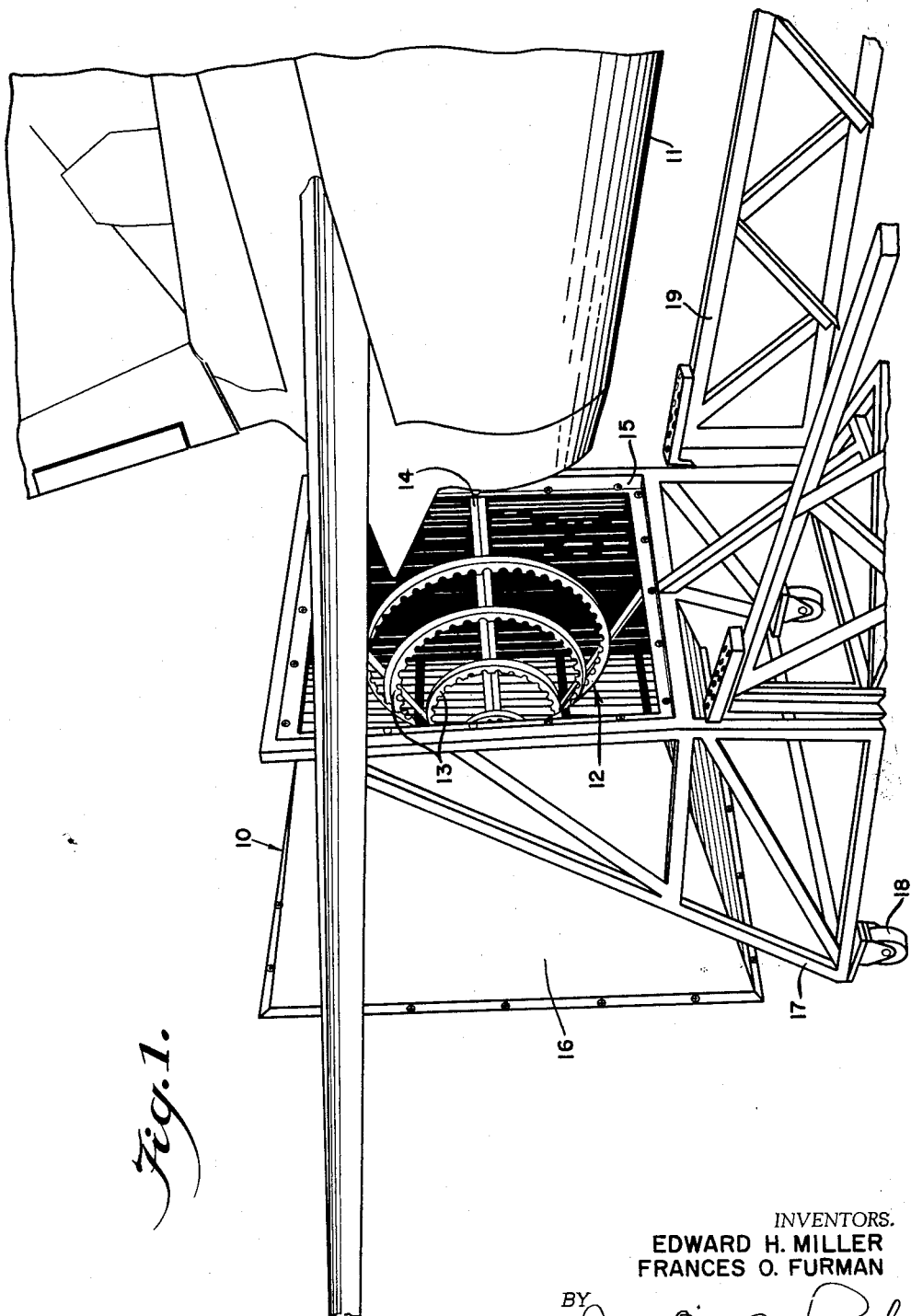

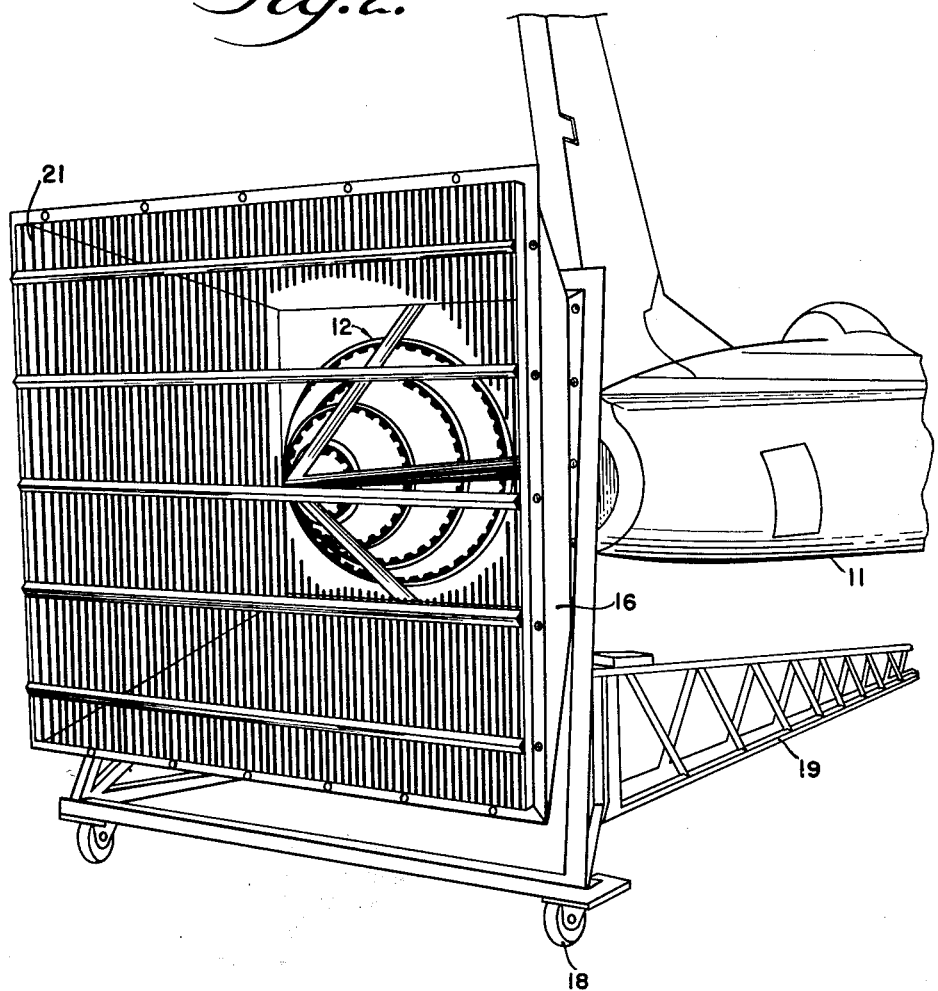
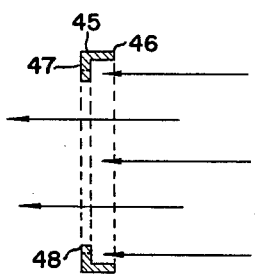

Filed July 19, 1957   3 Sheets-Sheet 3

INVENTORS.
EDWARD H. MILLER
FRANCES O. FURMAN
BY
Julian C. Renfro
ATTORNEY 3,165,167
NOISE INHIBITING DEVICE
Edward H. Miller, Baltimore, and Francis O. Furman, Towson, Md., assignors, by mesne assignments, to Koppers Company, Inc., a corporation of Delaware
Filed July 19, 1957, Ser. No. 672,894
6 Claims. (Cl. 181—51)

This invention relates to a noise inhibiting device and more particularly to such a device for use in conjunction with a jet engine, such as the engine of a jet aircraft.

The normal noise generated from the exhaust of a jet engine covers the entire frequency spectrum from 20 cycles per second through 10,000 cycles per second and above. The curve of frequency versus sound pressure level is not flat, but reaches a peak at from 150 to 300 cycles per second, where noise reduction by prior art devices is least effective.

In the past, a number of different noise suppression devices have been proposed for use in test installations and at airports for attenuating the noise accompanying the operation of jet engines. The most commonly used of such devices utilized large, expensive units, each of which required precise positioning with respect to the airplane with which it was being used. These devices have been principally of two basic types, absorptive and reactive. Absorptive mufflers use fibrous type material packed in and around the tubes constituting the muffler to absorb and dissipate the sound energy, whereas reactive mufflers cause a sufficient number of reflections of incident sound waves to decrease the energy levels in the waves. Some of these prior art devices light enough to be transportable achieved a degree of success, but in many instances such devices encountered resonance and at some engine speeds actually produced more noise than that originally produced by the engine. Other noise suppression devices have been more successful but typically these have been of very large size, often weighing in the the vicinity of 60,000 pounds or more. Furthermore, they have tended to cause an increase in engine back pressure, with a deletericus effect on engine structure and engine performance.

The present invention has proven to be a very effective noise inhibiting device of small enough size and weight as to be easily transportable from one location to another. This device preferably takes the form of a three dimensional, conically-shaped framework that is responsible for redistributing the noise frequencies emanating from the engine, that is, effective to shift and to flatten the curve representing low frequency noise causing community and personnel problems. Acoustical energy is shifted from the low frequencies which tend to travel for great distances, to high frequencies which relatively small and economical standard absorbtive material tend to readily reduce. Also, this high frequency noise, even though not attenuated by the fore-noted absorbtive material is not of major concern due to the rapid absorbtion of the high frequency sound waves in the atmosphere. Furthermore, standard ear protective devices are quite effective when used in a high frequency noise field, as compared with their relative ineffectiveness when used in conjunction with low frequency noises.

The principal noise inhibiting element of the device advantageously employs a series of hoop-like members of graduated size, mounted at spaced locations with respect to the tail pipe of a jet engine with which it is to be utilized. This element causes fine grain turbulence to be generated prior to the formation of high intensity noise, without engine performance being adversely affected. This invention is particularly effective in reducing noise in the 150 to 300 cycles per second range, for the device itself is of a length comparable to the wave length of sound at this frequency.

The hoop-like members are of finite size in the radial dimension, and the largest of the members, which is to be placed adjacent the tail pipe of the engine, is responsible for intercepting certain particles of the hot gases, and redirecting them so as to cause a change in the velocity frequency distribution. A circumferential layer of the stream of hot gases then flows outwardly between the largest member and the second largest member. Other particles of hot gases are intercepted by the second largest member, and are redirected so as to cause a further change in the velocity frequency distribution, and a second circumferential layer of said stream of hot gases flows outwardly between the second largest member and the third largest member. The redirecting and change in velocity distribution processes continue throughout the remainder of the length of the device, resulting in a diminution of directed velocity of the stream, with virtual elimination of eddies that create high intensity noise downstream of the engine.

To prevent the splaying of hot gases around an aircraft with which this invention may be used, a shroud member of divergent configuration may be employed about the noise inhibiting element. Also, a venturi member may be placed adjacent the upstream end of the series of spaced hoops so as to cause a pressure decrease in the area surrounding the core of hot gases entering the device, thereby aiding the mixing of cool secondary air with the hot gases. Additionally, the inner surfaces of the hoop-like members may be notched to further the process of breaking up the stream of hot gases, and a deflector plate may be used intermediate the entrance of the inhibitor and the outlet of the tail pipe of the jet engine to prevent damage resulting from the hot gases tending to flow in the reverse direction through the device.

As an example of the effectiveness of this device, noise reduction has been in the range of from 22 to 29 decibels, with the noise level at a distance of 500 ft. from the muffler being comparable to an unmuffled engine at approximately five miles distance. The weight of the device is in the vicinity of 6,000 pounds, as compared with a weight of approximately 60,000 pounds for prior art mufflers even somewhat approaching the effectiveness of the present device.

This invention will now be further described in conjunction with the appended drawings in which:

FIGURE 1 illustrates a perspective view of a primary embodiment of this invention in which an array of hoop-like members are mounted in spaced relation in a shroud member;

FIGURE 2 is another perspective view of the device according to FIGURE 1, showing a rear view of the attenuator according to the primary embodiment;

FIGURE 6 is a simplified showing of the cross-section of a typical hoop-like member.

Figure 3:
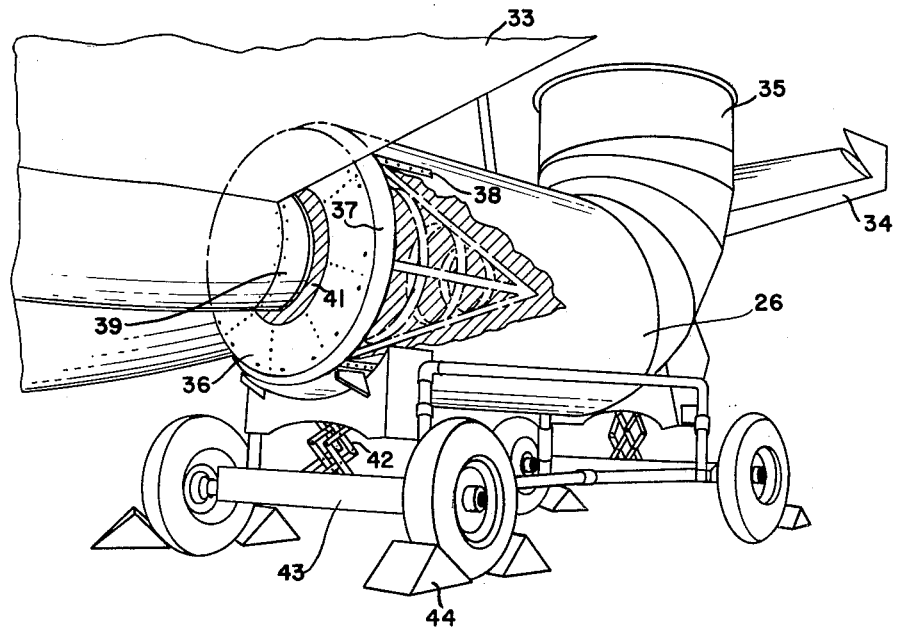
FIGURE 3 is a second embodiment of this invention illustrating how the present attenuator may be utilized in conjunction with aircraft having their jet engines in the wings.

Turning first to FIGURE 1, there is shown a first embodiment of a portable noise inhibiting device 10 for use in conjunction with a jet engine aircraft 11. The principal noise inhibiting element 12 comprises a series of hoop-like members 13 of graduated size, supported along an axis substantially aligned with the tail pipe of the jet engine of the aircraft, the members 13 being supported by members such as supporting bars 14. Bars 14 are attached to a forward frame member 15, which in turn is secured by bolts or the like to a frame 17, made of square steel tubing, for example.

In most instances, it is desired to surround the noise inhibiting element 12 to prevent splaying of the hot gases in the region of the aircraft, and to that end a shroud member is provided, which may be round or square as desired, and preferably divergent to maximize the flow of gases in the rearward direction. In FIGURE 1, shroud member 16 is of substantially square configuration, and supported adjacent its forward end by appropriate fasteners to the frame 17.

Frame 17 is equiped with wheels 18 or the like to enable the device to be moved along the ground. Elongated frame members 19 are removably secured at the front side edges of the frame for towing purposes, so that the noise inhibiting device may be moved by hand or by tractor means, and employed to attach the device to structural members of the aircraft to prevent relative movement of the noise inhibiting device with respect to the aircraft when the engines of the aircraft are being operated.

Referring to FIG. 2, the rear side of the device is revealed, which includes a comparatively large number of redirecting vanes 21 that extend between the upper and lower portions of the shroud. These vanes serve to direct the flow of hot gases in a desired direction, such as away from the aircraft fuselage when this type of device is being utilized in conjunction with aircraft in which the engines are located in the wings. It is, of course, well-known that if the hot gases are directed away from inhabited structures, that there will actually be less noise in those areas than would have otherwise been the case.

Figures 4, 5:
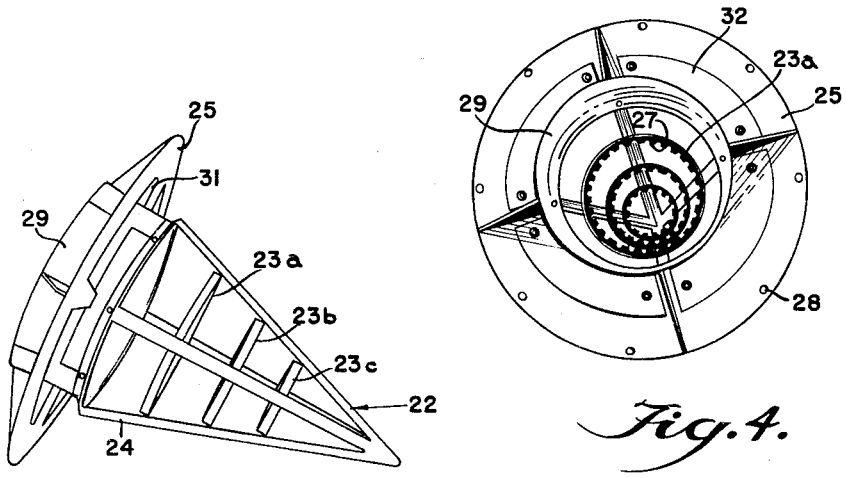
FIGURE 4 is a perspective view of a noise attenuating element according to this invention.
FIGURE 5 is a side view of the noise attenuating element of FIGURE 4, revealing more precisely the location of the venturi member.

Before considering a second embodiment of this invention, it is believed that a discussion is in order as to the principal features of a noise inhibiting device according to this invention. Turning to FIGURES 4 and 5, the noise inhibiting element 22, which is quite similar to element 12 of FIGURE 1, comprises a series of hoop-like members 23a, 23b, 32c, these members being of graduated size and supported at spaced locations along an axis substantially common to the members, such as by supporting bars 24 that join at their rearward ends to form a generally conical structure. A stream of hot gases entering the element 22 encounter virtually the same area of metal as would be encountered in a two-dimensional prior art "screen" type device, for when viewed along the longitudinal axis, the radial extent of the several hoop-like members amounts to quite a substantial total radial "thickness" to be perceived by the entering hot gases. However, it is important to note that the present device minimizes the substantial effects of back pressure by virtue of the fact that the hop-like members are longitudinally removed from each other, to permit hot gases entering said series of hoop-like members to flow outwardly between the members, which was not possible with prior art two dimensional devices. Also, this device does not possess resonant frequencies in the audible range, as were possessed by known prior art devices.

The stream of hot gases enter the series of hoop-like members, and certain of the particles of gases are intercepted by the largest member and redirected so as to cause a change in the velocity frequency distribution. A circumferential layer of the stream of hot gases then flows outwardly between the largest member 23a and the second largest member 23b.

Other particles of hot gases are intercepted by member 23b and redirected so as to cause a further change in the velocity frequency distribution, a second circumferential layer of said stream of hot gases flowing outwardly between member 23b and the next smaller member, member 23c. The redirecting, and the change in velocity distribution processes continue through the remainder of the length of the device, with virtual elimination of large eddies that create high intensity noise downstream of said engine. As may be desired, notches 27 may be placed at spaced locations about the inner periphery of the members 23a, 23b, 23c to aid the process of breaking up the stratified flow of hot gases from the engine, and the conversion of low frequency noise to higher frequency noise.

The noise inhibiting element illustrated in FIGURES 4 and 5 is of a construction particularly designed for use in a circular shroud, such as a shroud 26 as shown in FIGURE 3. To this end, a circular mounting plate 25 is adapted to be mounted at the upstream end of the device shown in FIGURES 4 and 5. This plate may have a spaced array of mounting holes 28 located about its periphery so that it may be secured such as by bolts in the desired manner at the upstream end of the shroud. Adjacent the upstream end of the noise inhibiting element 22 may be secured a venturi member 29 to receive the hot gases flowing from the engine tail pipe. These hot gases flow at high speed through the venturi, causing a well-known decrease in pressure, thereby causing a surrounding layer of cool secondary air to be drawn into the device around the hot gases. This secondary air serves the combined purpose of cooling the hot gases and the structural members of the device, as well as aiding in the slowing down and breaking up of the particles of gases emanating from the engine tail pipe, thus bringing about alteration of the basic noise frequency and consequent noise reduction. Additional inlets 31 surround the venturi member 29 to serve as additional entries for cooling air, but in the event that such additional air is not wanted, plates 32 may be bolted or otherwise secured over these inlets to prevent undesired flow therethrough.

Referring now to FIGURE 3, a second embodiment of this invention is there shown, particularly adapted for use in multi-engine aircraft in which the engine tailpipe is not along the center line of the fuselage, as in the case of aircraft 11 shown in FIGURE 1. In FIGURE 3, the aircraft 33 is equipped with an engine in each wing, with it therefore being necessary for the hot gases flowing from the noise inhibiting device to flow in such a manner as not to impinge upon the tail surface 34 of the aircraft. To this end, shroud or casing member 26 is provided with an upturned terminal end 35 serving to direct hot gases upwardly, away from the aircraft and humans on the ground alongside the aircraft.

As in the previous embodiment, the series of hoop-like members constituting the noise inhibiting element are disposed adjacent the inlet end of shroud 26. However, this embodiment differs somewhat from the previous embodiment in that a redirecting plate 36 is employed between the exit of the tail pipe 39 and the entrance to the noise inhibiting element. This plate is equipped with an encircling, rearwardly directed flange 37 which serves the purpose of preventing any reverse flow tending to take place through the inhibitor from coming into contact with the structure of the aircraft. As will be understood, the redirecting plate 36 causes any hot gases tending to flow in the reverse direction to flow radially outwardly and then rearwardly along the outer surface of the shroud so as not to cause structural damage to the aircraft. Appropriate straps or hangers 38 are secured about the front end of the shroud to form a support for the redirecting plate, being secured thereto by appropriate bolts.

It has been found that optimum results have been obtained if the rearmost end of the engine tail pipe 39 is maintained approximately 3 inches away from the centrally disposed hole 41 of the redirecting plate. Also, fore and aft clearance of three inches is preferably maintained between the exit nozzle and the redirecting plate to permit some relative movement during runup of the engine.

As may be desired, scissors type jacks 42 or similar devices may be employed upon the fore and aft ends of the wheeled supporting carriage 43 to permit the shroud 26 and its enclosed noise inhibiting element to be raised with respect to the undercarriage into desired alignment with the tail pipe of the engine. Appropriate wheel chocks 44 or the like may be employed to prevent the device from being moved out of position during running of the engine.

As shown in FIGURE 6, hoop-like member 45 representative of the several hoop-like members constituting our noise inhibiting element is preferably of angular cross-section. The peripheral portion 46 of member 45 extends in the direction facing the flow of hot gases, with the radial portion or flange 47 extending transversely to the flow of hot gases. This radial portion is preferably equipped with notches 48 to aid the breaking up of the flow of hot gases.

With regard to the configuration of a preferred noise inhibiting element according to this invention, the inlet diameter of a particularly effective embodiment of the type shown in FIGURES 4 and 5 is approximately 25 inches with the overall length of the device measured from the downstream end of the venturi member to the rearmost end of the bars supporting the hoop-like members being approximately 41 inches. In this instance, the diameter of member 23a is 19½ inches, the diameter of 23b is 14⅝ inches, and the diameter of 23c is 9¾ inches. Each hoop-like member is approximately 1½ thick in the radial direction, and notches were approximately of ⅝ inch radius with 21 notches being located upon ring 23a, 15 notches on ring 23b and 9 notches on ring 23c. The hoop-like members are preferably of hot rolled steel welded into the 360° configuration shown, but these members may be made of various alloy steels when such is occasioned.

Various modifications are within the orbit of this invention, and some success has been obtained utilizing hoop-like members of circular cross-section, with cooling liquid such as water circulated through the hoop-like members to maintain them in the desired cooled state. This arrangement may generally be along the lines of that taught in the Brenneman et al. Patent No. 2,685,936 wherein in FIGURE 4 the patentees teach the use of a spray manifold 42, equipped with parts 43 from which water may issue, to have a cooling effect upon the hot jet.

It is to be realized that the foregoing dimensions are exemplary, and that this invention is in no manner intended to be limited thereto. A larger number or a smaller number of hoop-like members may be employed than were illustrated and described herein, this decision being dictated by engine back pressure, size of unit, and other such considerations.

We claim:

1. A noise inhibiting device for use in conjunction with a stream of high velocity gas emanating at high speed from the tailpipe of a jet engine comprising a series of hoop-like members of graduated size, and a plurality of generally longitudinally disposed supporting members secured together in a generally conical configuration having an apex portion at the farthest downstream part of said device, said supporting members supporting said hoop-like members in spaced relation along the principal axis of the supporting members, with the largest of said hoop-like members disposed in the upstream position, the hoop-like members of progressively smaller diameter being supported by said supporting means at progressively increased distances downstream, each of said hoop-like members having a cross section along the principal axis of the stream of comparatively small dimension as compared with its overall diameter, with each hoop-like member having an inner diameter which is slightly greater than the outer diameter of the next smaller hoop-like member, thereby defining an approximately straight-through flow path for high velocity gas to flow through said noise inhibiting device, each of said hoop-like members having radially-extending portions serving to intercept and redirect successive circumferential layers of hot gas from said stream and cause the intercepted gas to flow radially, the gas remaining in the original stream after the several hoop-like members have peeled off circumferential layers then impinging upon said apex portion, at which the remaining portion of gases remaining after traveling through said hoop-like members is eliminated, the change in the velocity frequency distribution resulting from collision with said hoop-like members occurring throughout the length of said device, resulting in a diminution to directed velocity of the stream, with virtual elimination of eddies that create high intensity noise.

2. A noise inhibiting device for use in conjunction with a stream of high velocity gas emanating at high speed from the tailpipe of a jet engine comprising a series of hoop-like members of graduated size, and at least one member for supporting said hoop-like members in spaced relation in the high velocity stream, with the largest of said loop-like members disposed in the upstream position and hoop-like members of progressively smaller diameter supported at spaced intervals downstream thereof, each of said hoop-like members having a cross section along the principal axis of the stream of comparatively small dimension as compared with its overall diameter, with each hoop-like member, except the smallest such member, having an inner diameter which is dimensionally close to the dimension of the outer diameter of the next smaller hoop-like member, thereby defining an approximately straight-through flow path for high velocity gas to flow through said noise inhibiting device, each of said hoop-like members having radially-extending flange portions serving to intercept and redirect successive circumferential layers of hot gas from said stream and cause the intercepted gas to flow radially, the change in the velocity frequency distribution resulting from collision with said hoop-like members occurring throughout the length of said device, resulting in a diminution of directed velocity of the stream, with virtual elimination of eddies that create high intensity noise.

3. The device of claim 2 in which said members are supported on an open frame, and have serrations thereon for creating substantial turbulence in the gas stream.

4. The noise inhibiting device as defined in claim 1 in which said hoop-like members have inner peripheral portions that are serrated so as to aid the break up of the flow of gas particles, thereby to enhance the noise attenuating characteristics, and a venturi member secured adjacent the upstream end of said hoop-like members, through which venturi member the hot gases are constrained to flow, the resultant decrease in pressure causing secondary air to enter said device and to mix with said hot gases.

5. The noise inhibiting device as defined in claim 4 in conjunction with a redirecting plate located intermediate the tail pipe of said engine and said venturi member, said redirecting plate functioning to prevent damage to the aircraft by redirecting any hot gases tending to flow in the reverse direction through said device and preventing them from impinging upon parts of said aircraft.

6. A jet engine exhaust noise attenuator comprising an outer housing having an inlet opening at one end thereof and an outer opening spaced from said inlet opening, and a conical inner member supported in coaxial radially inwardly spaced relation within the housing with the base of said conical member disposed adjacent said inlet opening of said housing, said conical member comprising a plurality of annular metal rings disposed in alignment coaxially of said outer shell and spaced apart axially thereof, the inner edge of each ring being spaced radially outwardly of the periphery of the next adjacent smaller ring to provide a plurality of concentric annular openings facing longitudinally of the conical member, each ring further having a plurality of notches around its inner edge, said base of said conical member and said outer housing cooperating to define an annular air inlet chamber.

References Cited in the file of this patent

UNITED STATES PATENTS

| | | |
|---|---|---|
| 981,770 | Kreis | Jan. 17, 1911 |
| 1,532,928 | O'Connor | Apr. 7, 1925 |
| 1,685,701 | Blanchard | Sept. 25, 1928 |
| 1,745,492 | Kelch et al. | Feb. 4, 1930 |
| 1,946,908 | Hanson | Feb. 13, 1934 |
| 2,373,231 | Demuth | Apr. 10, 1945 |
| 2,389,059 | Kurth | Nov. 13, 1945 |
| 2,674,335 | Lemmerman | Apr. 6, 1954 |
| 2,685,936 | Brenneman et al. | Aug. 10, 1954 |
| 2,720,935 | Lysholm et al. | Oct. 18, 1955 |
| 2,810,449 | Coleman | Oct. 22, 1957 |

FOREIGN PATENTS

| | | |
|---|---|---|
| 20,963 | Great Britain | 1908 |
| 893,730 | Germany | Oct. 26, 1953 |